United States Patent [19]

Schnell, deceased

[11] Patent Number: 5,054,698

[45] Date of Patent: Oct. 8, 1991

[54] CUTTING UNIT FOR A COMMINUTING MACHINE

[75] Inventor: Karl Schnell, deceased, late of Winterbach, Fed. Rep. of Germany, by Dr. Ernst Otto Schnell Sole Heir

[73] Assignee: Karl Schnell GmbH & Co. Maschinenfabrik, Winterbach, Fed. Rep. of Germany

[21] Appl. No.: 584,471

[22] Filed: Sep. 18, 1990

[30] Foreign Application Priority Data

Sep. 23, 1989 [DE] Fed. Rep. of Germany ....... 3931813

[51] Int. Cl.[5] ............ A23K 3/00

[52] U.S. Cl. ............ 241/82.6; 241/292.1

[58] Field of Search ............ 241/82.5, 82.6, 82.7, 241/152 A, 157, 292.1, 261.1

[56] References Cited

U.S. PATENT DOCUMENTS

| | | | |
|---|---|---|---|
| 667,029 | 1/1901 | Masher | 241/82.6 |
| 2,282,671 | 5/1942 | Motte | 241/82.5 |
| 3,823,882 | 7/1974 | Jensen | 241/260.1 |
| 4,204,647 | 5/1980 | Jensen | 241/82.6 |
| 4,775,108 | 10/1988 | Schnell | 241/82.5 |

FOREIGN PATENT DOCUMENTS

| | | | |
|---|---|---|---|
| 2840337 | 4/1979 | Fed. Rep. of Germany | 241/82.5 |

*Primary Examiner*—Mark Rosenbaum
*Assistant Examiner*—Frances Chin
*Attorney, Agent, or Firm*—Toren, McGeady & Associates

[57] ABSTRACT

A cutting unit for a comminuting machine, particularly for meat. The cutting unit includes a perforated disk and a drivable cutting knife body with cutting edges which interact with the perforated disk. The cutting knife body has additional cutting edges which extend approximately in radial direction. The additional cutting edges interact with approximately radially extending counter-cutting edges of the machine housing. The additional cutting edges may be provided in the form of grooves on the free ends of arms of a star-shaped cutting knife body. The counter-cutting edges may be provided on a housing ring which can be easily replaced and repaired. The additional cutting edges and the counter-cutting edges do not contact each other. The cutting edges preferably extend parallel to each other and are located on an imaginary outer truncated cone-shaped generated surface of the cutting knife body and an inner truncated cone-shaped surface of the machine housing.

8 Claims, 2 Drawing Sheets

CUTTING UNIT FOR A COMMINUTING MACHINE

BACKGROUND OF THE INVENTION

1. Field of the Invention

The present invention relates to a cutting unit for a comminuting machine, particularly for meat and the like. The cutting unit includes a perforated disk and a drivable cutting knife which interacts with the perforated disk.

2. Description of the Related Art

Cutting units of the above-described type and the corresponding comminuting machines have been in use for a long time in the food industry, particularly in the meat-processing industry. The comminuting machines include one or more cutting units of the above-described type which are arranged one behind the other in travel direction of the material to be cut. The material, which in the case of the meat-processing industry may be meat, rinds, tendons and other cuttable portions of animals, is usually conveyed by means of a feeding screw toward the cutting unit. The cutting knife is mounted on the same shaft as the feeding screw or the like, so that both can be driven together with the same rate of rotation. When several cutting units are provided one behind the other, the first cutting unit serves for coarse cutting, while the subsequent cutting units further comminute the material, so that the material at the end leaves the machine at the outlet in a finely comminuted state. The degree of fineness depends on the cross-sectional site of the holes in the perforated disk.

Due to the particular shape of the cutting knives which are usually used, and also since the cutting knives may not contact the housing surrounding them or an annular housing portion in which the cutting knives are mounted, a certain gap exists in radial direction between the cutting knife bodies and the machine housing or the like. The material to be cut may collect in this gap and, thus, the cutting result may be negatively influenced.

SUMMARY OF THE INVENTION

It is, therefore, the primary object of the present invention to provide a cutting unit of the above-described type which is further improved, so that it operates with greater effectiveness.

In accordance with the present invention, additional or auxiliary cutting edges extending approximately in radial direction are provided at a cutting knife body. The additional or auxiliary cutting edges interact with approximately radially extending counter-cutting edges of the machine housing.

It is now possible additionally to carry out a comminuting process in radial direction between the cutting knives and the stationary portion of the comminuting machine surrounding the cutting knife. This additional comminuting process causes the material which has penetrated in the gap between the cutting knives and the stationary portion of the machine to be severed from the remaining material which is still in front of the cutting knives seen in feeding direction of the material. As a result, feeding of the material to the main cutting edges of the cutting unit and to the perforated disk are facilitated. Moreover, accumulations of the material in the outer portion of the cutting unit, particularly in the outer portion of the perforated disk, are prevented.

The construction of the cutting knives and the width of the gap between the cutting knives and the housing as well as the comminuted material itself determine to what extent an exclusive cutting procedure takes place or whether only individual lumps are severed from the material to be cut. At any rate, obstructions to the travel of the material through the comminuting machine ar reduced and feeding of the material to the cutting unit are improved. In addition, the effectiveness of the cutting unit is improved, which also includes an elimination of undesirable local heating of the material.

In accordance with a further development of the invention, at least the additional cutting edges are formed by grooves or similar recesses in the cutting knife body. The cutting effect improves with increased sharpness of the groove or recess. The cutting process can also be influenced by the cross-sectional shape of the groove or recess, wherein it is particularly desirable if one of the edges has an advantageous angle.

In accordance with another feature of the present invention, the grooves or the like are provided on the generated surface of the cutting knife body and extend in the direction of or slightly inclined to a generatrix of the cutting knife body. However, the above-mentioned generated surface is not a complete generated surface in the sense of a generated surface of a cylinder or truncated cone. Rather, the generated surface may be interrupted in conventional fashion. In the latter case, the grooves are of course only provided at those portions which remain of an imaginary cylindrical, truncated cone-shaped or other generated surface.

Correspondingly constructed and aligned grooves may be provided at the interior of the housing, so that the grooves of the housing form cutting edge pairs with the grooves of the cutting knife bodies.

In accordance with another development of the invention, the generated surface of the cutting knife body is truncated cone-shaped and the grooves or the like of the counter-cutting edges are provided on a truncated cone-shaped inner surface. Of course, the angles of the cones are equal or essentially equal.

In accordance with a preferred feature of the invention, the cutting knife body is a hub with approximately radially or tangentially projecting arms. The grooves or the like are provided at the free end faces of the arms. Several arms are being provided. Preferably, the cutting knife body has five to twelve arms. However, as is long known, a cutting knife body with fewer arms can be used.

In accordance with a preferred feature of the invention, the greater surface of the truncated cone of the cutting knife's body faces the perforated disk and the grooves or the like of the machine housing are provided on a removable housing ring. Thus, when the housing ring is damaged or worn, it can be easily replaced by a new one or can be repaired if necessary. In addition, a different material can be used for this ring than for the housing of the comminuting machine, particularly a material which better withstands the loads acting on it.

The cutting knife body is adjustable in direction of its axis of rotation toward the perforated disk. When the maximum cutting height is adjusted, a minimum gap distance exists between the additional cutting edges and the counter-cutting edges. The cutting edges of the cutting knives are preferably provided on cutting blades which are inserted in the cutting knife body and, thus, are adjustable or readjustable after grinding. The cutting blades are of an especially high-grade material, particularly knife steel. Since the cutting edges nevertheless wear and, therefore, the cutting knives must be adjusted toward the perforated disk when the blade has become shorter due to grinding, the size of the gap is increased. However, this stays within relatively small limits, so that the effectiveness of the radial cutting device is hardly negatively affected.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DESCRIPTION OF THE PREFERRED EMBODIMENT

Figure 1:
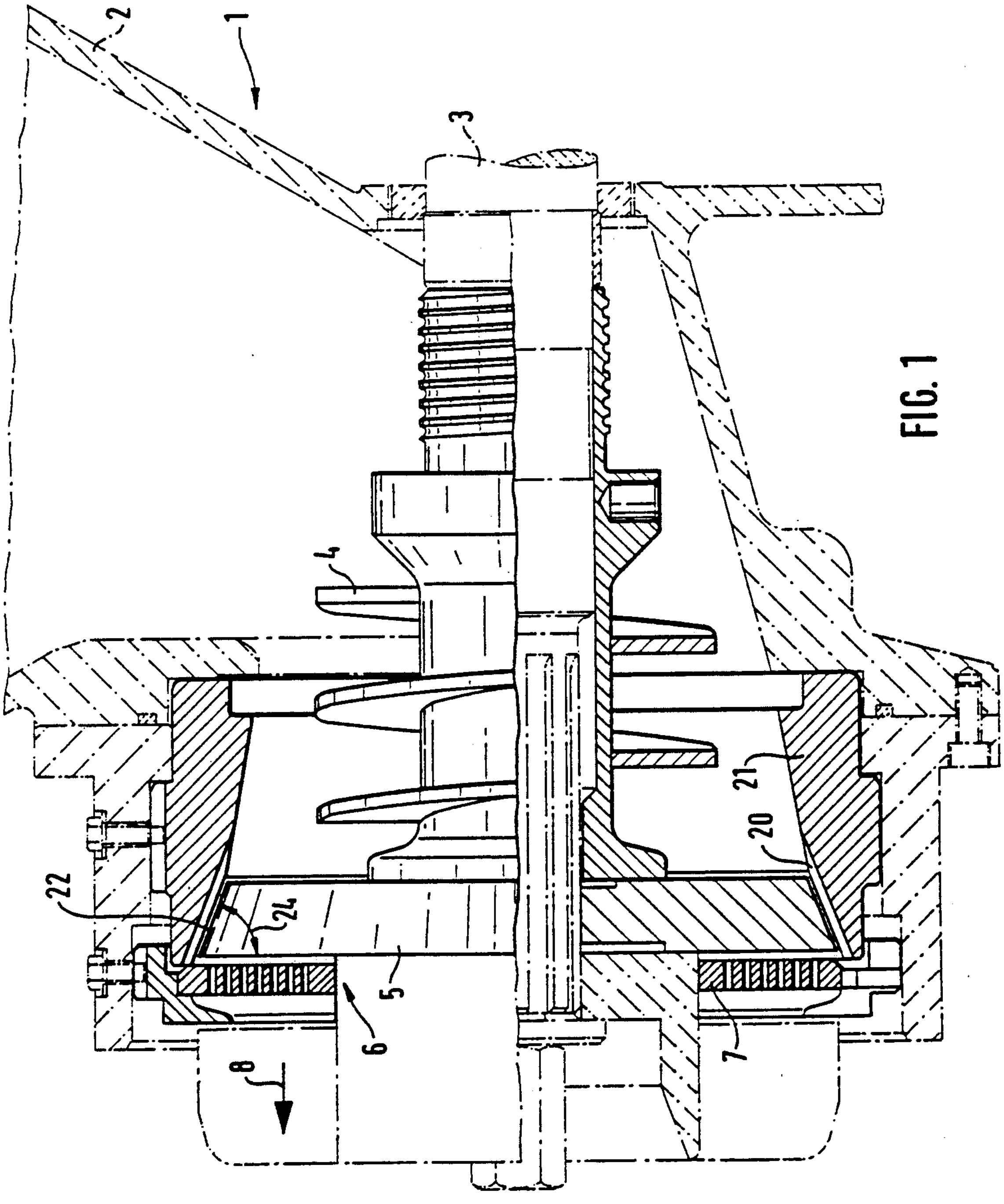
FIG. 1 is vertical longitudinal sectional view of a cutting unit mounted in a comminuting machine shown in dash-dot lines.

A comminuting machine 1 which is only partially illustrated in FIG. 1 includes a feed hopper 2 for the material to be comminuted and a drive shaft 3 which is driven by an electric motor, not shown. A feeding screw 4 and a cutting knife member 5 of a cutting unit 6 are mounted on the shaft 3 so as to rotate therewith. The cutting unit additionally includes a perforated disk 7 of conventional construction.

The material to be comminuted, for example, meat, rinds, tendons, sinews, and the like, is placed in the feed hopper 2 and is conveyed by the feeding screw 4 which extends into the lower end of the hopper toward the cutting unit 6. The material is then comminuted by means of the cutting unit and is conveyed out of the machine in the direction of arrow 8. The comminuted material discharged from the machine may be deflected at a suitable location, however, this deflection is of no significance with respect to the present invention.

Figure 3:
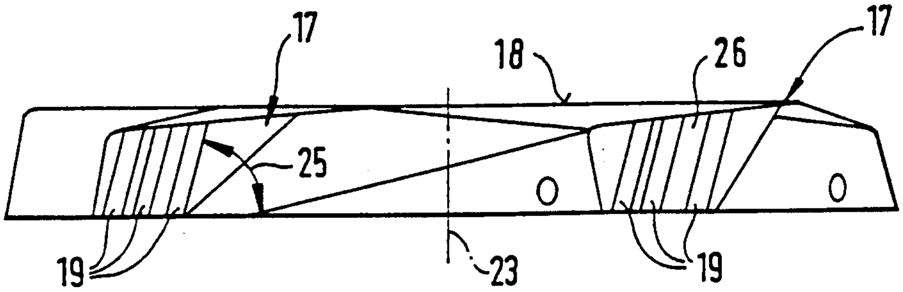
FIG. 3 is a side view of FIG. 2.
Figure 2:
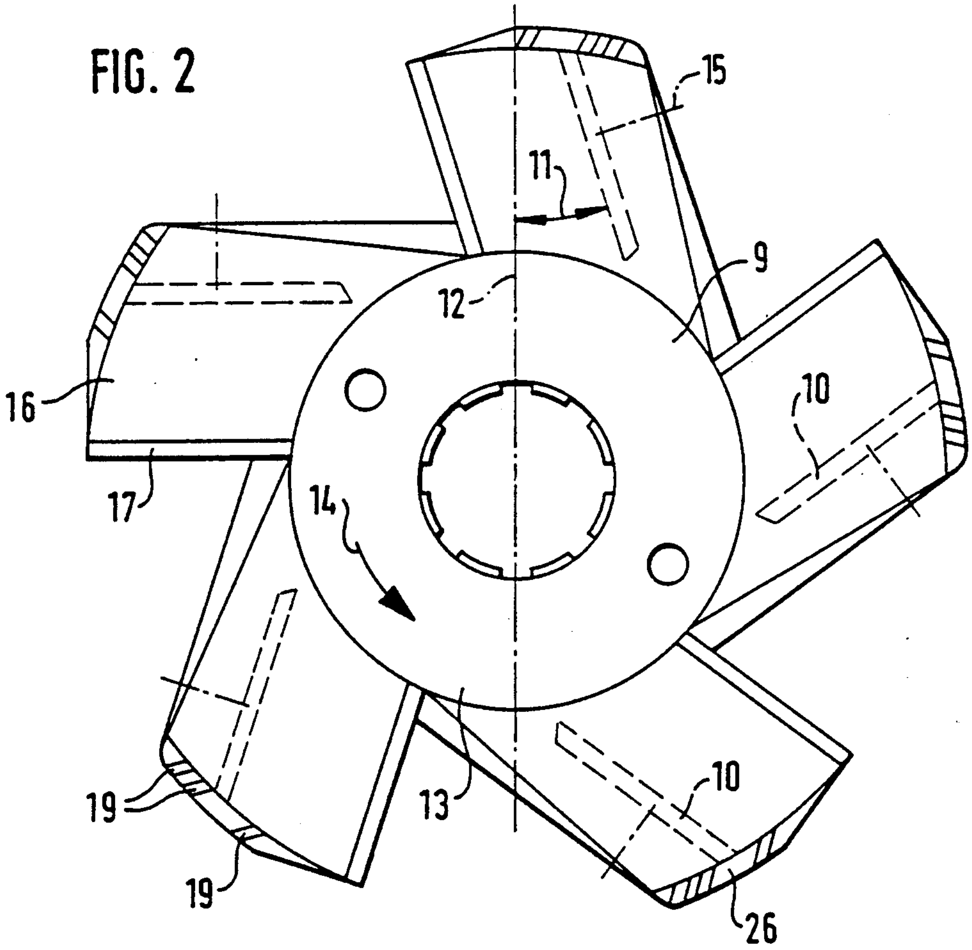
FIG. 2 is a top view of the cutting knives.

As illustrated in FIGS. 2 and 3, the cutting knife member 5 includes a cutting knife body 9 with cutting blades 10 which are replaceably and adjustably inserted in the cutting knife body 9. As shown in FIG. 2, the cutting edges of the blades extend at an acute angle 11 relative to a radius 12 through the hub 13 of the cutting knife body 9. As seen in the direction of rotation 14, the outer end of each cutting blade 10 leads relative to the inner end. A fastening element 15 is symbolically indicated by a dash-dot line.

In the illustrated embodiment, the cutting knife member 5 includes the above-mentioned hub 13 and arms 16 which are approximately tangentially attached to the hub 13. More precisely, in the shown embodiment, the rearward longitudinal edge of each arm 16 extends approximately tangentially to the hub 13. The leading edge 17 of each arm serves as a precutter. Each leading edge 17 extends to a hub surface 18 which faces the inner end of the hub.

In accordance with the present invention, additional or auxiliary cutting edges 19 are provided on the cutting knife body or, as in the illustrated embodiment, at the free ends of the arms 16. In particular, the additional cutting edges 19 are formed by shaping the free ends of the arms 16. The additional cutting edges 19 extend in approximately radial direction and interact with approximately radially extending counter-cutting edges 20 of the machine housing for additionally comminuting the material. The counter-cutting edges 20 may be provided on a housing ring 21 of the machine housing.

As seen in FIG. 1, a gap 22 exists between the additional cutting edges 19 and the counter-cutting edges 20, so that cutting, as it occurs between the cutting blade 10 and the perforated disk 7, does not take place at this location. Nevertheless, the additional cutting edges 19 and the counter-cutting edges 20 interact in order to comminute the material which has reached the gap 22.

As can be seen in particular in FIG. 3, the additional cutting edges 19 each extend slightly inclined relative to a generatrix which is parallel to the geometric axis of rotation 23, wherein the upper end of each additional cutting edge 19 is the leading end. The counter-cutting edges 20 have a corresponding inclination.

The additional cutting edges 19 and the counter-cutting edges 20 are further inclined when the free, front ends of the arms 16 form portions of a truncated cone surface, wherein the smaller truncated cone surface area faces the hub surface 18. In FIG. 1, the angle of the truncated cone is denoted by reference numeral 24. The angle of the truncated cone is approximately 60° to 70°, while the angle of inclination 25 is approximately 15°. The free end faces of the arms 16 which, as mentioned, are portions of an enveloping truncated cone surface, are denoted by reference numeral 26.

While a specific embodiment of the invention has been shown and described in detail to illustrate the inventive principle, it will be understood that the invention may be embodied otherwise without departing from such principles.

I claim:

1. In a cutting unit for a comminuting machine for meat materials, the comminuting machine including a housing, the cutting unit including a perforated disk and a drivable cutting knife body with main cutting edges interacting with the perforated disk, the improvement comprising the cutting knife body having a generated surface, additional cutting edges extending approximately in radial direction on the generated surface of the cutting knife body in direction of or slightly inclined to a generatrix of the generated surface, and counter-cutting edges provided on an inner surface of the machine housing, such that the additional cutting edges and the counter-cutting edges face each other, whereby the counter-cutting edges have an approximately radial cutting effect in cooperation with the additional cutting edges.

2. The cutting unit according to claim 1, wherein the additional cutting edges are formed by grooves.

3. The cutting unit according to claim 2, wherein the cutting knife body includes a hub and approximately radially projecting arms attached to the hub, the arms having free end faces, the grooves being provided at the free end faces.

4. The cutting unit according to claim 2, wherein the cutting knife body includes a hub and approximately tangentially projecting arms attached to the hub, the arms having free end faces, the grooves being provided at the free end faces.

5. The cutting unit according to claim 1, wherein the generated surface of the cutting knife body and the inner surface of the comminuting machine are truncated cone-shaped.

6. The cutting unit according to claim 5, wherein the truncated cone-shaped cutting knife body has a greater and a smaller cone end face, the greater cone end face facing the perforated disk.

7. The cutting unit according to claim 1, wherein the comminuting machine housing includes a removable housing ring, the counter-cutting edges being provided in the housing ring.

8. The cutting unit according to claim 1, wherein the cutting knife body has an axis of rotation, the cutting knife body being adjustable in direction of the axis of rotation toward the perforated disk, a gap distance existing between the additional cutting edges and the counter-cutting edges, the gap distance being smallest when the main cutting edges have a maximum cutting height.

* * * * *